(12) United States Patent
Eidinger

(10) Patent No.: US 10,233,963 B2
(45) Date of Patent: *Mar. 19, 2019

(54) DEFORMABLE FASTENING THREAD PROVIDING WEDGE-EFFECT

(71) Applicant: Martin Eidinger, Quebec (CA)

(72) Inventor: Martin Eidinger, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/794,383

(22) Filed: Oct. 26, 2017

(65) Prior Publication Data

US 2018/0073548 A1 Mar. 15, 2018

Related U.S. Application Data

(63) Continuation of application No. 15/264,742, filed on Sep. 14, 2016, now Pat. No. 9,803,679.

(51) Int. Cl.
  *F16B 19/04* (2006.01)
  *F16B 39/284* (2006.01)
  *F16B 33/02* (2006.01)
  *F16B 39/30* (2006.01)

(52) U.S. Cl.
  CPC ........... *F16B 39/284* (2013.01); *F16B 33/02* (2013.01); *F16B 39/30* (2013.01)

(58) Field of Classification Search
  CPC .................. F16B 39/284; F16B 33/02
  USPC ....... 411/360, 417, 421, 264, 309, 310, 311, 411/411
  See application file for complete search history.

(56) References Cited

U.S. PATENT DOCUMENTS

| | | | |
|---|---|---|---|
| 1,953,095 A | 4/1934 | Baker | |
| 3,487,442 A * | 12/1969 | Rossmann | ............ F16B 33/02 220/228 |
| 4,171,012 A | 10/1979 | Holmes | |
| 4,225,981 A | 10/1980 | Zeibig | |
| 4,252,168 A | 2/1981 | Capuano | |
| 4,334,814 A | 6/1982 | McKewan | |
| 4,549,754 A | 10/1985 | Saunders | |
| 4,734,002 A | 3/1988 | Holmes | |
| 4,810,149 A | 3/1989 | Lee | |
| 4,850,775 A | 7/1989 | Lee | |
| 5,738,472 A | 4/1998 | Roopnarine et al. | |
| 6,672,813 B1 | 1/2004 | Kajita | |
| 6,976,818 B2 | 12/2005 | Levey et al. | |
| 7,281,925 B2 | 10/2007 | Hall | |
| 7,722,304 B2 | 5/2010 | Pritchard | |
| 8,465,240 B2 | 6/2013 | Corbett et al. | |
| 8,602,781 B2 | 12/2013 | Reed | |
| 8,671,547 B2 | 3/2014 | Matsubayashi et al. | |
| 9,011,506 B2 | 4/2015 | Wen et al. | |
| 9,181,972 B2 | 11/2015 | Mori | |
| 2002/0136616 A1* | 9/2002 | Birkelbach | ......... F16B 25/0021 411/411 |

(Continued)

FOREIGN PATENT DOCUMENTS

DE 10308130 9/2004
JP 2007-132398 5/2007

*Primary Examiner* — Gary W Estremsky

(74) *Attorney, Agent, or Firm* — Robert M. Schwartz; Alfred K. Dassler

(57) ABSTRACT

Disclosed is a fastener that includes a thread having a groove formed therein to provide a loosening resistance due to a deformation of the thread, the deformation resulting from a threshold axial force applied to the thread by a receiving structure.

1 Claim, 6 Drawing Sheets

(56) References Cited

U.S. PATENT DOCUMENTS

| | | | |
|---|---|---|---|
| 2004/0172032 A1* | 9/2004 | Jackson | A61B 17/683 606/278 |
| 2006/0222475 A1 | 10/2006 | Breihan et al. | |
| 2009/0047093 A1 | 2/2009 | Pritchard | |
| 2011/0033263 A1 | 2/2011 | Matsubayashi | |
| 2012/0047709 A1* | 3/2012 | Matsubayashi | F16B 39/30 29/428 |

* cited by examiner

DEFORMABLE FASTENING THREAD PROVIDING WEDGE-EFFECT

CROSS REFERENCE TO RELATED APPLICATIONS

This application is a continuation of U.S. patent application Ser. No. 15/264,742, filed Sep. 14, 2016, entitled "Deformable Fastening Thread Providing Wedge-Effect" and which the aforementioned application is incorporated herein by reference in its entirety.

FIELD OF THE INVENTION

The present invention relates generally to fastening mechanisms, and more particularly to a deformable fastening thread for increasing a loosening resistance of a threaded fastening arrangement.

BACKGROUND OF THE INVENTION

It is common for fastening elements such as bolts and nuts to be fastened to one another, or to hold down one material to another. A bolt may have an external helical thread and a nut may have an internal helical thread. The internal thread and the external thread may be configured to allow the nut and bolt to axially move relative to one another by torqueing one of the members relative to the other. Upon tightening, the axial force between the nut and bolt is resisted by the threads. As such, one or more materials may be sandwiched between a head of the bolt and the nut to tighten the nut and the bolt around the one or more materials.

However, common fastening elements may loosen after being tightened. For example, thread profiles may be manufactured according to a certain tolerance, causing a tightened nut and bolt to loosen.

U.S. Pat. No. 8,671,547 issued to Matsubayashi et al. discloses a fastening member that supposedly exerts a loosening-inhibition effect. However, Matsubayashi et al. is focused on elastic deformation of a thread, and is therefore limited in providing a loosening resistance, since an elastic deformation of the thread would naturally be forced back to an original undeformed state, which would cause or allow loosening axial forces.

Further, Matsubayashi et al. is focused on elastically deforming an external thread to directly increase a frictional force between an internal flank of a nut and a pressure-side flank of an external thread, due to the elastic deformation. For example, an axial force resulting from a tightening torque applied to the screw of Matsubayashi et al. will be opposed and resisted by the elastic deformation. As such the hypothetical loosening-inhibition effect of Matsubayashi et al. is caused by a loosening axial force directed away and opposite from a tightening axial force direction.

The fastening arrangement proposed by Matsubayashi et al. is limited and problematic in tightening two or more fastening members together, since the elastic deformation causes a loosening axial force (e.g. away from a head of a bolt), opposing any fastening axial forces (e.g. toward a head of a bolt) which is normally required to tighten two objects together. For example, two pieces of material such as metal are commonly tightened together by sandwiching the two materials between a head of a bolt or screw, and a nut, and the elastic deformation of Matsubayashi et al. would resist tightening axial forces, thus defeating the purpose of fastening arrangements of bolts or screws and nuts.

As such, there exists a need for a fastening thread for effectively increasing a loosening resistance of a threaded fastening arrangement.

BRIEF SUMMARY OF THE INVENTION

Disclosed is a fastener comprising, a head end, and a helical thread having an insertion direction flank facing away from said head end and a removal direction flank facing towards said head end, said removal direction flank having a groove formed therein, said groove having a maximum depth being at least one half a thickness of said helical thread at a height position of said maximum depth of said groove on said helical thread.

In another aspect, said groove is disposed at a root of said thread.

In another aspect, said groove has a substantially triangular cross-section.

In another aspect, said groove has a curve in its cross section, said curve being between said height position of said groove and said removal direction flank.

In another aspect, said groove is disposed substantially below a pitch diameter of said thread.

In another aspect, said groove is configured to allow said thread to deform and increase a major diameter of said thread due to an axial force.

In another aspect, said groove allows said thread to plastically deform due to said axial force.

In another aspect, said groove allows said thread to plastically deform at a plastic hinge near said root of said thread.

In another aspect, said axial force is applied in response to a tightening torque applied to said fastener.

In another aspect, due to said groove, said tightening torque transfers to cause a deformation of said thread to increase said major diameter of said thread due to said deformation.

In another aspect, said maximum depth of said groove has a height dimension that is at least half a distance between two roots of said thread.

In another aspect, said axial force is applied in response to a tightening torque applied to said fastener, said tightening torque causing said fastener and a receiving structure to tighten together due to said thread being helical.

In another aspect, due to said groove, said tightening torque transfers to cause a deformation of said thread to increase said major diameter of said thread due to said deformation, said deformation being caused when a threshold axial force is applied to said removal direction flank.

APPENDIX

Appendix A contains a research project prepared at the inventor's request.

DETAILED DESCRIPTION OF THE INVENTION

Disclosed is a fastener 100 including a head end 102, a helical thread 104, and a groove 106 formed in the thread 104, as shown by example in the figures. The fastener 100 may resemble a bolt or a screw, or any fastener member or element that has a helical thread, however the fastener 100 described herein includes a groove 106 (FIG. 2-3) formed therein which is not found in typical fasteners. Details of the groove 106 are described in more detail below. The fastener 100 may include or may be composed of steel or carbon steel material or a combination thereof. The length of the fastener 100 may be between three-quarters of an inch (¾") to one and one half inches (1½). The fastener 100 may be an existing conventional fastener which is augmented with the groove 106 being formed therein, or preferably a newly manufactured fastener that includes the groove 106 as a result of initial manufacture.

Figure 1:
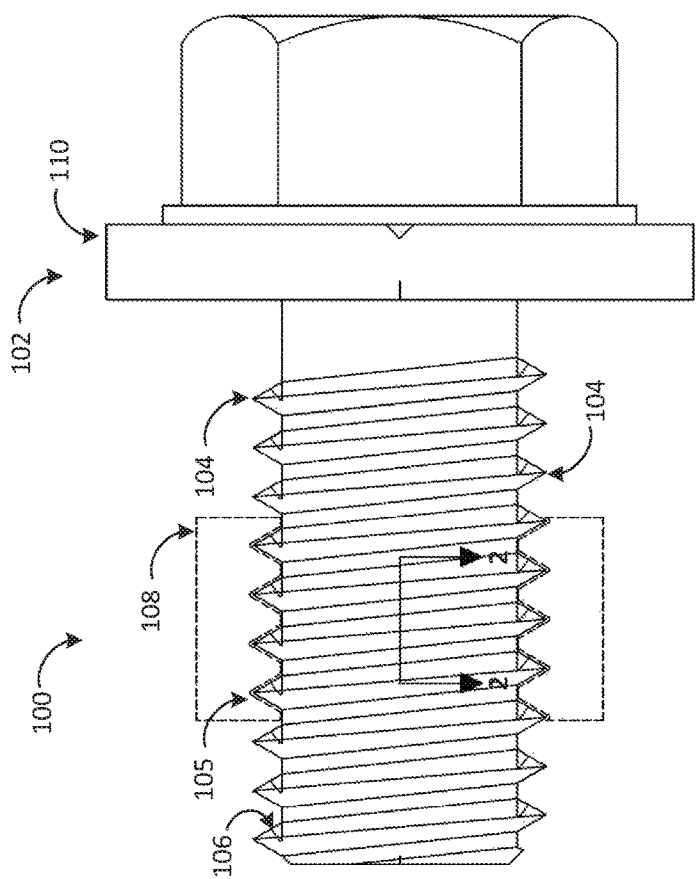
FIG. 1 shows a side view of a fastener having a first embodiment of a deformable fastening thread.

The fastener 100 may be tightened into a material, substrate, or receiving structure 108 such as a nut (FIGS. 1 and 3) having an internal thread 105. It is to be understood that as described herein, "receiving structure" may refer to any structure that may receive the fastener 100, such as an internally threaded fastening member (nut) or a material or substrate (e.g. a sheet of metal or piece of wood).

Figure 2:
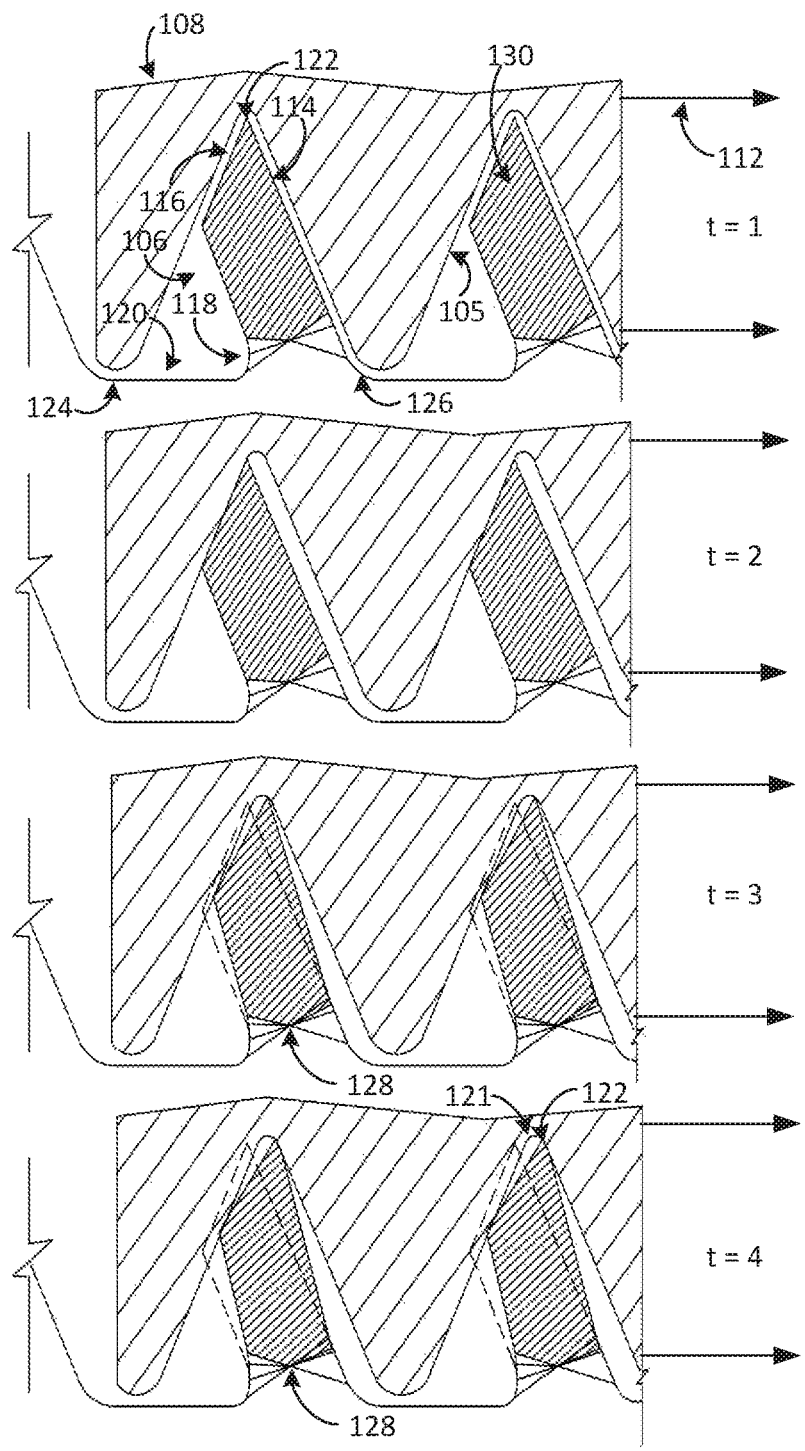
FIG. 2 shows a deformation sequence of a partial view of the deformable fastening thread, the partial view taken from sectional line 2-2 of FIG. 1.
Figure 3:
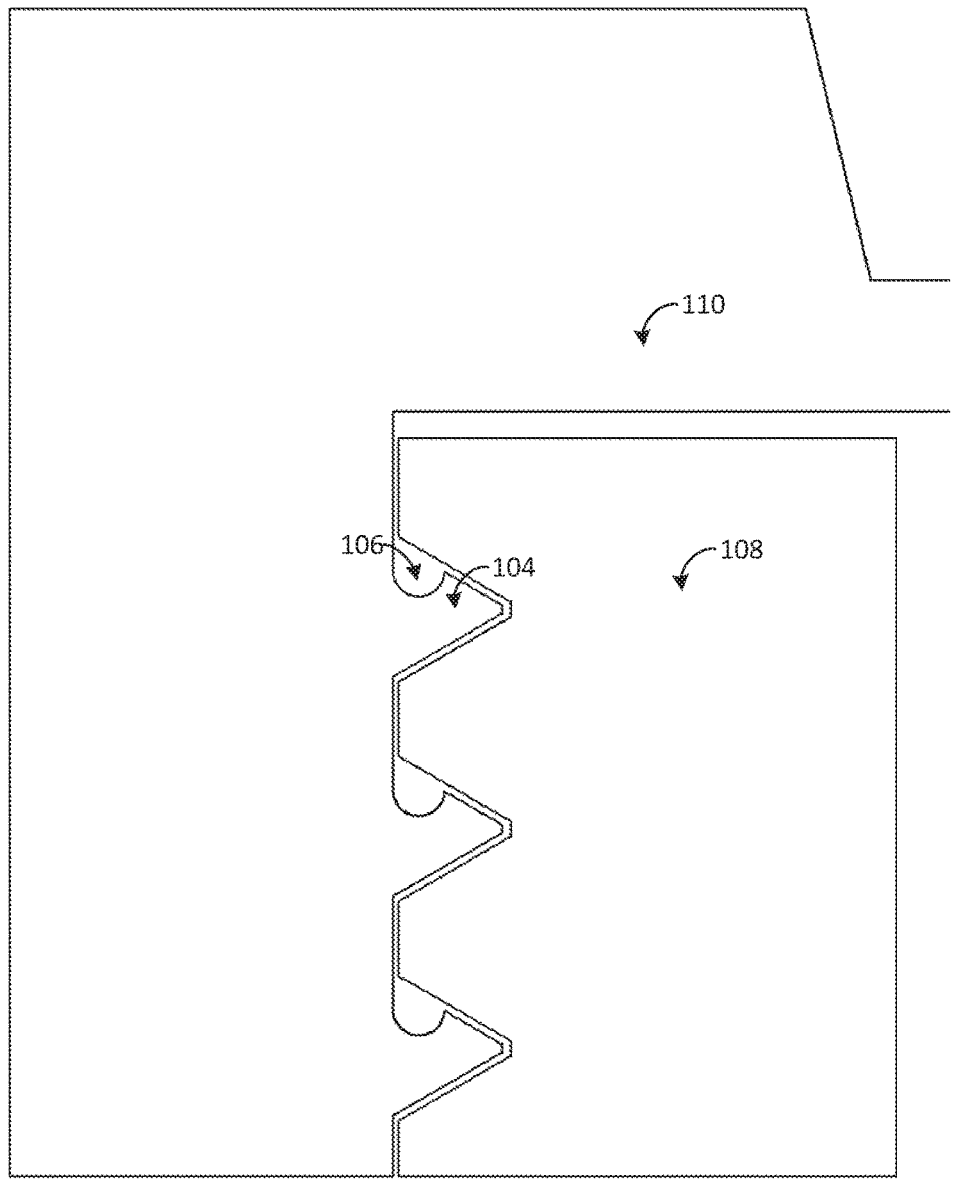
FIG. 3 shows a second embodiment of a deformable fastening thread where a groove of the thread is curved, in accordance with "FIG. 9" of Appendix A.

The groove 106 causes the thread 104 to deform when an appropriate force is applied to the thread 104 to increase a loosening resistance (i.e. to prevent loosening) of the fastener 100 while the fastener 100 is tightened into a receiving structure 108, as described in detail below (FIG. 2).

When received in an appropriate structure (e.g. receiving structure 108 or a material), the fastener 100 may be tightened by applying a tightening torque to the fastener 100, or to a head 110 of the fastener 100 (e.g. via a screwdriver or a wrench), to cause the fastener 100 to rotate about a longitudinal or central axis of the fastener 100 or thread 104 and be axially displaced toward the receiving structure 108 due to the applied rotation, causing the thread 104 to corkscrew into the receiving structure 108. As such, the thread 104 may be configured to cause an axial force 112 (FIG. 2) to be applied to the fastener 100 due to a rotation occurring between the fastener 100 and a target material or receiving structure 108 (e.g. nut) while the fastener 100 is received or mated in the receiving structure 108. A tightening rotation may cause a tightening axial force 112 (e.g. forcing the head 110 of the fastener 100 and a receiving structure 108 together), and a loosening rotation may cause a loosening axial force (e.g. forcing the head 110 of the fastener and a receiving structure 108 apart). For example, the thread 104 may have a helical or corkscrew configuration externally wrapping around a longitudinal body (e.g. shank or shaft) of the fastener 100 such that, upon the thread 104 being received by the receiving structure 108, via a tightening direction of rotation, the fastener 100 may be tightened into the receiving structure 108, and via an opposite, loosening direction of rotation, the fastener 100 may be loosened from the receiving structure 108. As such, when subjected to the tightening rotation, the head of the fastener 100 and a receiving structure 108 move toward each other, or in other words, a distance between the head 110 of the fastener 100 and the receiving structure 108 decreases due to the tightening rotation. On the other hand, when subjected to a loosening rotation, the head of the fastener 100 and the receiving structure 108 may move apart, or a distance between the head of the fastener 100 and the receiving structure 108 may increase due to the loosening rotation.

When a receiving structure 108 and/or the fastener 100 are tightened to a maximally tightened state with respect to one another, further tightening torque or tightening axial force is resisted. For example, the fastener 100 and/or the receiving structure 108 may be tightened to a maximally tightened state when the receiving structure 108 is contacting the head 110 of the fastener 100 or when both the head 110 and the receiving structure 108 are contacting a material sandwiched between the receiving structure 108 and the head 110 of the fastener 100. When not in this maximally tightened state, a receiving structure 108 and the fastener 100 may be axially displaced relatively easily due to relative rotation between the fastener 100 and the receiving structure 108, since a longitudinal resistive force may not be present.

For example, a material (e.g. a sheet of metal, not shown in the drawings) may have a bore, the fastener thread 104 may pass through the bore, and the receiving structure 108 may be disposed on an opposite side of the material with respect to the head 110 to receive the fastener thread 104 in an internal thread 105 of the receiving structure 108. In this example, the head 110 and the receiving structure 108 may be larger than the bore such that the head 110 and the receiving structure 108 cannot pass through the bore, and where the dimensions of the bore keep the head 110 and the receiving structure 108 on opposite sides of the material. The receiving structure 108 and the fastener 100 may be tightened to a maximally tightened state where the material, between the head 110 of the fastener 100 and the receiving structure 108, resists any further tightening and attractive motion between the receiving structure 108 and the head 110. In some cases, a fastener may be tightened into a material without requiring such a bore, and the fastener 100 may drill into the material while fastening to the material, or one or more materials sandwiched therebetween.

In this maximally tightened state, any or all subsequent tightening torque applied to the fastener 100 or the receiving structure 108 will be transferred into an axial force 112 applied mainly or majorly to and/or between the threads of the fastener 100 and/or the receiving structure 108 (FIG. 2), since the axial tightening displacement or motion of the receiving structure 108 and/or the head 110 is resisted. Such a maximally tightened state occurs at a point where a tightening torque, and subsequently, an axial displacement, is longitudinally (i.e. axially) resisted to cause an axial force 112 to be directed to the thread 104 of the fastener 100 due to a tightening rotation, since if the longitudinal displacement of the fastening members is resisted, the helical thread 104 would be subject to (i.e. absorb) an axial force 112 directly in response to further applied tightening torque. For example, such an axial force 112 may be applied by an internal thread 105 of a nut to an external thread 104 of a bolt in a maximally tightened state. As such, in this maximally tightened state, tightening torque is transferred to an axial force 112 majorly applied to the thread 104 since the fastening members would be unable to longitudinally displace. Any situation or state where the axial displacement of the receiving structure 108 or the fastener 100 is longitudinally or axially resisted may be considered an appropriate maximally tightened state.

The present disclosure includes a groove 106 in the fastener thread 104 to take advantage of such axial force 112 applied to the thread 104 and to provide loosening resistance of a threaded fastening arrangement. For example, the threaded fastening arrangement may be an arrangement where a fastener 100 is tightenable into a receiving structure 108 or receiving material.

The following terms and plain meanings and definitions thereof will be used to describe the disclosed fastener thread, the groove, and method of using the same.

A major diameter of a fastener or thread is a diameter of an overall shaft of the fastener, including a height of a raised helix. A major diameter may be measured on crests with a caliper ruler or slot gauge. For example, a major diameter of a thread may be a diameter of an imaginary co-axial cylinder that just touches a crest of an external thread. In other words, a major diameter may be a largest diameter of a thread.

A minor diameter refers to or measures a diameter of a root or an innermost part of a fastener thread and/or shank, not including crests of a helix of the thread. For accuracy, this measurement requires specialized equipment. The minor diameter may be the diameter of an imaginary cylinder that just touches roots of an external thread. As a non-limiting example, the minor diameter may be a diameter of an imaginary cylinder that just touches crests of an internal thread, for example, when the external thread is received in the internal thread. In other words, the minor diameter is a smallest diameter of a shank or thread.

A pitch of a thread or fastener is a distance between two corresponding points on adjacent identical threads (i.e. between two identical, adjacent, thread "teeth" when viewed in longitudinal cross-section). The pitch is analogous to a "period" in discussing wave phenomenon, such that the two points defining the length of the pitch are located at adjacent repeating points on the thread structure. The pitch of a thread may be a distance, measured parallel to its axis, between corresponding points on adjacent repeating, identical, surfaces, in a same axial plane (e.g. where the points are co-linear with a line that is parallel with a longitudinal axis of the fastener shank). In other words, the pitch may be a distance from a point on a fastener thread to a corresponding point on a next thread.

A flank of a fastener or thread is a side at which a helix is raised to form a crest on the thread. The flanks of a thread are straight sides that connect a crest and a root. In other words, a flank may be a surface between a crest and an adjacent root, or may be a side of a thread surface connecting a crest and a root.

A crest of a fastener or thread is a height at which an external thread is raised, or a depth at which an internal thread is indented (in embodiments where an internal thread and an external thread mate). For common applications, fasteners such as screws and bolts are measured at crests, while nuts or receiving members are measured at roots. For example, a crest of a thread is a prominent part of a thread, whether internal or external. A top surface with respect to a central axis of a fastener may be considered a crest of a thread. In other words, a crest may be a top surface joining two flanks or sides.

A root of a fastener is a bottom of a space between two flanking surfaces of a thread whether internal or external. For example, a root may be considered a bottom surface joining two adjacent flanks of a thread.

A pitch diameter, often called an effective diameter, is a diameter of an imaginary co-axial cylinder which intersects a surface of a thread in such a manner that an intercept of the cylinder, between points where the cylinder meets opposite flanks of a thread "tooth" (e.g. opposite flanks sharing a crest), is equal to half a pitch of the thread. For example, the pitch diameter may be a diameter at which a line cuts the spaces between threads and threads equally, usually approximately half way between the major and minor diameters. In other words, it measures halfway up a helix crest. For accuracy, this measurement also requires specialized equipment.

The angle of a thread may be an angle between flanks, measured in an axial plane section. In other words, the angle of a thread may be an angle between adjacent threads, where a root is or includes a vertex of the angle.

A longitudinal axis of a fastener is a longitudinal centerline of a shank or thread of the fastener. For example, the axis may be substantially parallel and co-linear with a rotational axis on which the fastener rotates due to an applied tightening rotation.

A lead of a thread is an axial advance of a helix or screw during one complete turn (360°). For example, the lead for a fastener thread is the axial travel resulting from a single revolution of the thread in a receiving member.

A tooth of a thread is a protruding part of the thread between two adjacent roots of the thread, which is viewed in longitudinal cross-section along an axial plane.

The disclosed thread 104 may have an insertion direction flank 114 facing away from the head end 102 and a removal direction flank 116 facing towards the head end 102 (FIG. 2).

The removal direction flank 116 may have a groove 106 formed therein. The groove 106 may have a maximum depth being at least one half a thickness of the helical thread 104 at a height position 118 of the maximum depth of the groove 106 on the helical thread 104. For example, the height position 118 may be a maximum point, apex, or peak of the groove 106 with respect to a distance between roots 120 of the thread, or a distance between two adjacent lowest points (roots) of the thread or thread tooth. For example, in longitudinal cross-section (FIG. 2), the thread may have a tooth 130 having first and second adjacent flanks that meet at a single crest 122, where one of the flanks has the groove (e.g. removal direction flank 116) and subtends (e.g. imaginarily) to contact or meet a minor diameter of the thread 104 at a first root point 124, and where the other one of the flanks (e.g. insertion direction flank 114) may extend to meet or contact the minor diameter at a second root point 126, where the groove 106 may be disposed between the two root points 124 and 126. For example, the height position 118 may be at least below a crest 122 of the thread such that a perpendicular line extending from, and with respect to, the longitudinal axis of the fastener thread intersects the groove 106, the maximum depth, and/or the height position 118 of the groove 106. The maximum depth of the groove 106 may have a height dimension that is at least half a distance between two adjacent roots 120, or half a distance between between the above described first root point and second root point, of the thread. In some embodiments, the maximum depth may be at least half a value of a pitch distance of the thread. An exemplary preferred dimension or depth of the groove may be between 50-55% of a distance between the above described first and second root points.

As such, the groove 106 may be disposed at a root 120 of the thread 104. For example, the groove 106 may be disposed at a root 120 of the thread 104 such that a surface of the root is co-planar or continuous (e.g. in cross section)

with a bottom surface of the groove 106. The groove 106 may have a substantially triangular cross-section. In some embodiments, the groove 106 has a curve in its cross section (FIG. 3), the curve being between the height position 118 of the groove 106 and the removal direction flank 116. In embodiments where the groove 106 is triangular, a surface of the groove 106 between the height position 118 of the groove 106 and the removal direction flank 116 may be substantially flat (in longitudinal cross section), and a bottom surface of the groove 106 may also be substantially flat (in longitudinal cross section), to produce the triangular cross-section. For example, the triangular cross section may have a first triangle vertex at a maximum depth (e.g. height position 118) of the groove 106, a second vertex where the groove meets the removal direction flank 116 surface, and a third vertex where a subtending line of the removal direction flank 116 surface meets a minor diameter of the thread or the shank of the fastener 100. The groove 106 may be disposed substantially below a pitch diameter of the thread 104.

The groove 106 may be configured to allow the thread 104 to deform (FIG. 2) and increase a major diameter of the thread 104 due to an axial force 112. For example, the groove 106 may allow the thread 104 to plastically deform due to the axial force 112. As such, the groove 106 may be dimensioned specifically to allow this plastic deformation in response to an appropriate tightening axial force 112, such as when the thread 104 is subjected to a tightening axial force 112 when the fastener and/or a receiving structure 108 are at a maximally tightened state as described above. In other words, the groove 106 may allow the thread 104 to plastically deform at a plastic hinge 128 near the root 120 of the thread 104. As such, a longitudinal "tooth" cross-section (e.g. tooth 130) of the thread 104 may rotate about a plastic hinge due to the groove's shape and an appropriate tightening axial force 112 to cause a crest 122 of the thread tooth 130 to extend laterally with respect to a longitudinal axis of the fastener thread 104 (e.g. the longitudinal axis may extend from the head end to a distal insertion end), and to cause the cross section of the groove to expand. For example, the axial force 112 may be applied to the removal direction flank 116. The thread 104 may deform at least to a plastic phase of deformation. One or more teeth 130 near the head end 102 may deform. For example, at least 1-6 teeth 130 near the head end 102 may be configured to deform as described herein. In some embodiments, any tooth 130, any number of turns of the thread 104, or any portion of the thread 104 that is subjected to an appropriate axial force 112 may deform as described herein.

The axial force 112 may be applied in response to a tightening torque applied to the fastener 100. Due to the groove 106, the tightening torque may subsequently transfer to the thread 104 to cause a deformation of the thread 104 and to increase a major diameter of the thread 104 due to the deformation. For example, the tightening torque may be applied when the fastener 100 and/or receiving structure 108 is at a maximally tightened state. The axial force 112 may be applied in response to a tightening torque applied to the fastener 100, the tightening torque causing the fastener 100 and a receiving structure 108 to tighten together due to the thread 104 being helical. Due to the groove 106, the tightening torque may transfer to cause a deformation of the thread 104 to increase the major diameter of the thread 104 due to the deformation, the deformation being caused when a threshold axial force 112 is applied to the removal direction flank 116. For example, the threshold axial force 112 may be determined by dimensions of the groove 106, the external thread 104, and/or an internal thread 105 of a receiving structure 108. For example, a lead, pitch, or any of the defined structures above, of a thread, may be specifically configured to cause the threshold tightening axial force 112 to be applied to the thread 104 for deforming the thread 104 as described herein. Specific dimensional and material characteristics of the thread 104 or a receiving structure 108 may determine an appropriate threshold axial force 112. Further, dimensional tolerances between fastening members, threads, or receiving members may be selected to allow tightening torque to be applied appropriately for being transferred into an axial force that deforms the thread as described herein.

The thread may deform to cause a crest 122, or a tip of the thread, to extend into a receiving structure 108 or an internally threaded member (FIG. 2). For example, the thread 104 may deform laterally due to the groove to laterally cut into a root 121 of an internally threaded member, receiving structure 108, or substrate. In other words, longitudinal forces such as an axial force 112 may be transferred to the thread to deform the thread, thus causing the axial force 112 to transfer into opposing transverse forces applied to a receiving structure 108. For example, the opposing transverse forces may be applied to a root 121 of an internally threaded structure like a nut due to the deformation. For example, in FIG. 2, at t=1 an internal thread 105 and an external thread 104 of the fastener 100 are being brought together, at t=2 the internal thread 105 and the external thread 104 make contact at a removal direction flank 116 of the external thread 104, at t=3 the axial force 112 starts to cause the external thread 104 to deform toward the insertion direction flank 114, and at t=4 the thread 104 has deformed such that a crest 122 of the thread contacts and laterally pushes on a root 121 of the internal thread 105 to produce a loosening resistance for the fastener 100. The dashed line in FIG. 2 represents a previous, un-deformed, position of the thread.

The deformation of the thread may cause a wedge effect between one or more crests of the thread and respectively mated roots of an internally threaded structure (nut) or a receiving structure (FIG. 2), as the crests of the thread 104 wedge into the receiving structure 108. Therefore, as an axial force 112 causes the deformation of the thread 104, the axial force 112 transfers to a radial force applied outward toward a receiving structure 108 thus centrally compressing a base of the thread 104 (e.g. near the roots or the minor diameter) with at least an intention of increasing the fastener's resistance to pull-out. For example, the crests of the thread may deform and become jammed into an internal thread such that lateral displacement and loosening rotation is resisted due to the pressure exerted by the crests. Further, the subsequent wedge effect may provide an increased tensile strength of the fastener, since upon applying the wedge effect, the wedge effect compresses the thread toward a central axis of the thread.

Figure 4:
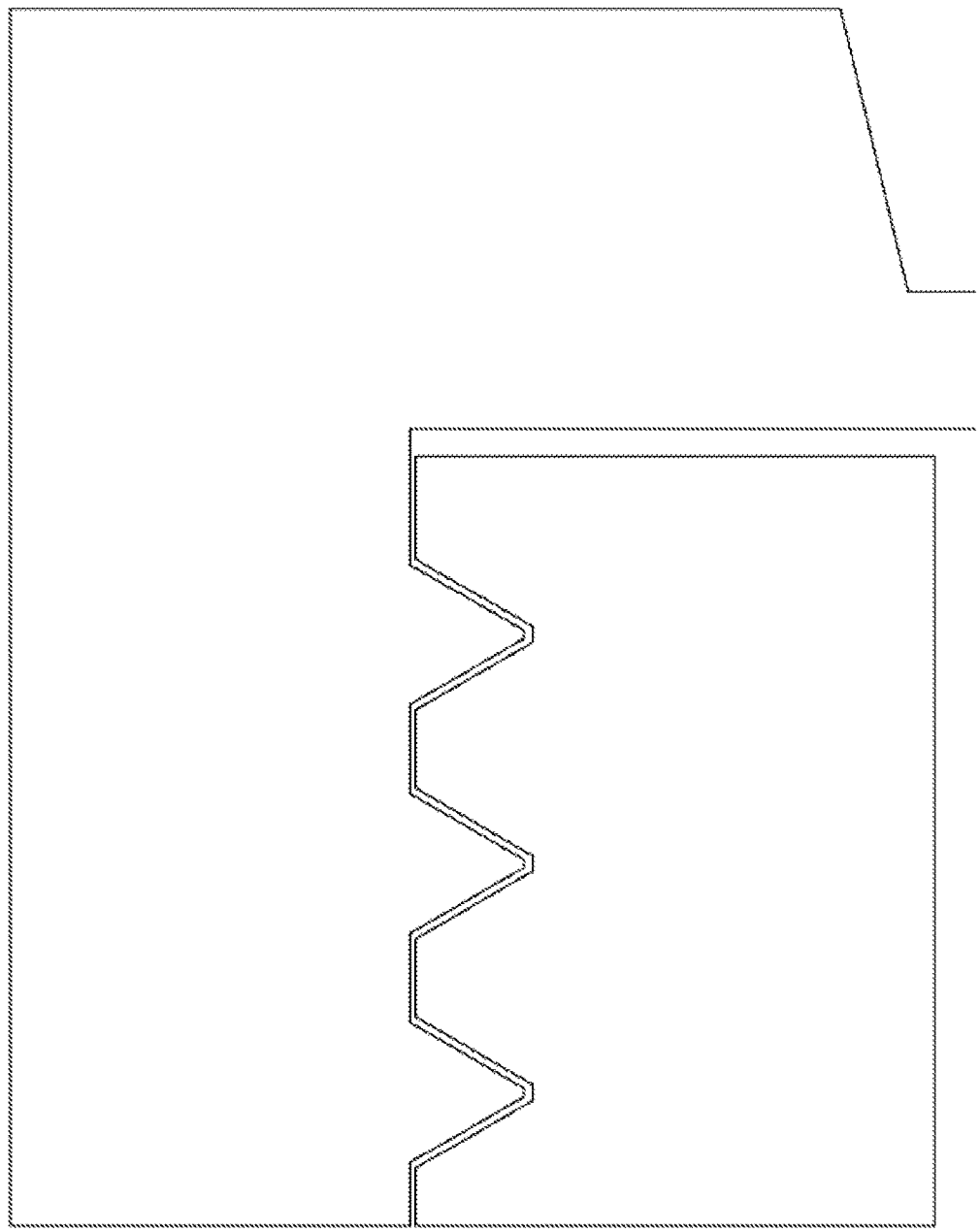
FIG. 4 shows a conventional fastening thread engaging an internal thread of a nut, in accordance with "FIG. 7" of Appendix A.
Figure 5:
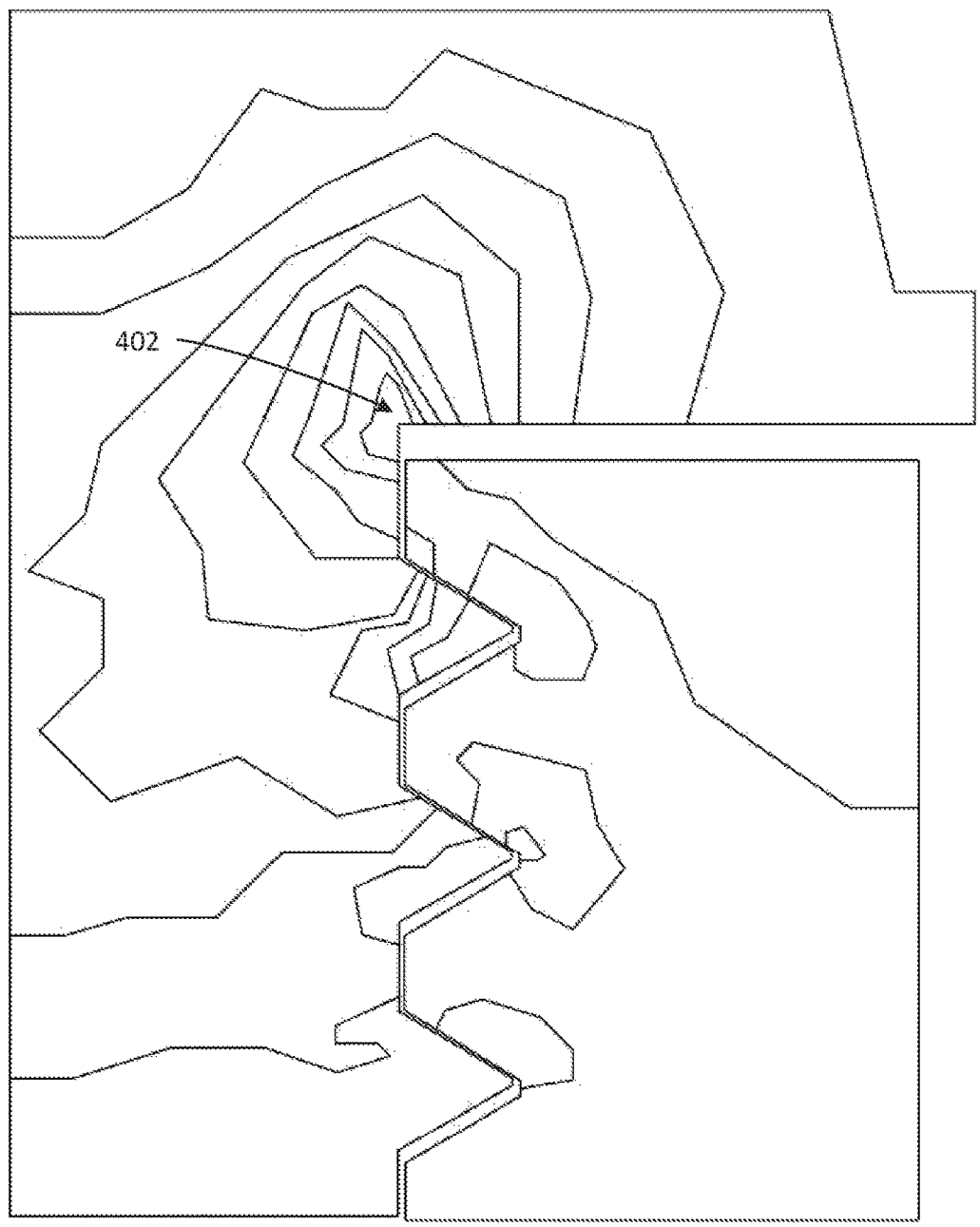
FIG. 5 shows stress contours on the conventional fastening thread where the nut is applying an axial force to the conventional fastening thread, in accordance with "FIG. 11" of Appendix A.
Figure 6:
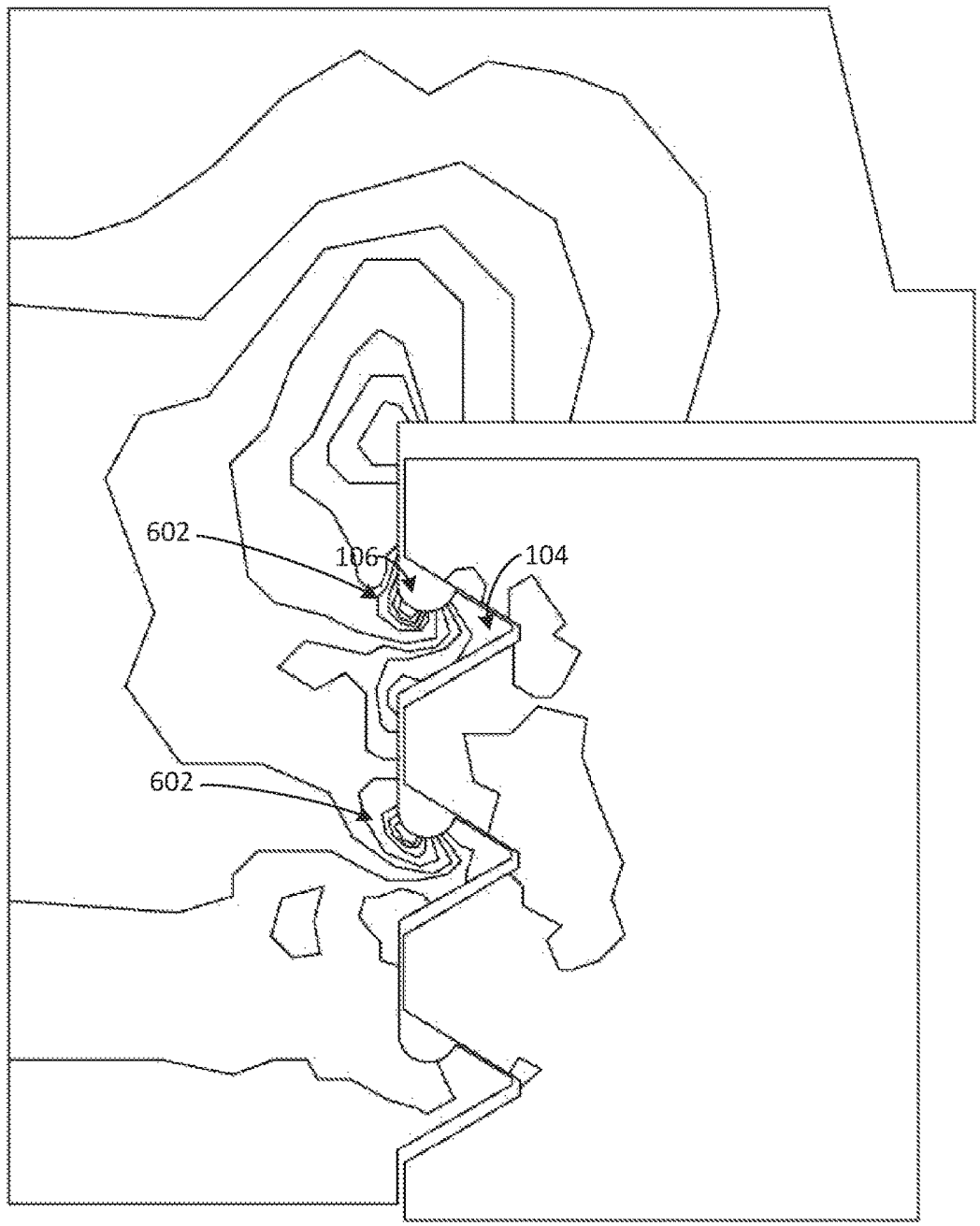
FIG. 6 shows stress contours on the second embodiment of the deformable fastening thread engaging an internal thread of a nut where the nut is applying an axial force to the second embodiment of the deformable fastening thread, in accordance with "FIG. 12" of Appendix A.

As a further consequence of the groove in the thread, a typical failure mode observed in Appendix A moves to the deformable thread. For example, a first failure mode of a conventional fastener (excluding the groove) has been observed in Appendix A to be located near a root of a thread and a head of the fastener. This first failure mode shifts or moves to the threads, since the threads are configured to deform due to an appropriate axial force, and hence absorb forces that are conventionally directed to the first failure mode. This novel shift of failure mode to the threads may have an advantage in real-world applications where the first failure mode is frequently observed to cause problems. For example, FIG. 4 shows an unstressed conventional fastener, and FIG. 5 shows a typical failure mode (concentrated stress contours 402) of a conventional fastener, and FIG. 6 shows concentrated stress contours 602 of the herein disclosed improved fastener thread 104. In comparison, it can be seen that stress contours in FIG. 5 are concentrated near a corner 402 where the head and the root of the conventional screw thread meet. As an improvement, it can be seen that the stress contours 602 in FIG. 6 are focused at the threads instead of being focused at the head-root corner at 402.

In conclusion, disclosed is a novel and improved fastener thread that provides a loosening resistance due to a groove formed in the thread.

I claim:

1. A fastener comprising:
 a head end; and
 a helical thread having a crest, an insertion direction flank facing away from said head end and a removal direction flank facing towards said head end, said removal direction flank having a groove formed therein, said groove having a depth allowing said thread to plastically deform at a plastic hinge near said root of said thread for increasing a major diameter of said thread due to an axial force.

\* \* \* \* \*